Aug. 16, 1966 D. W. EVANS 3,266,762
HANGER CLAMP
Filed June 9, 1965
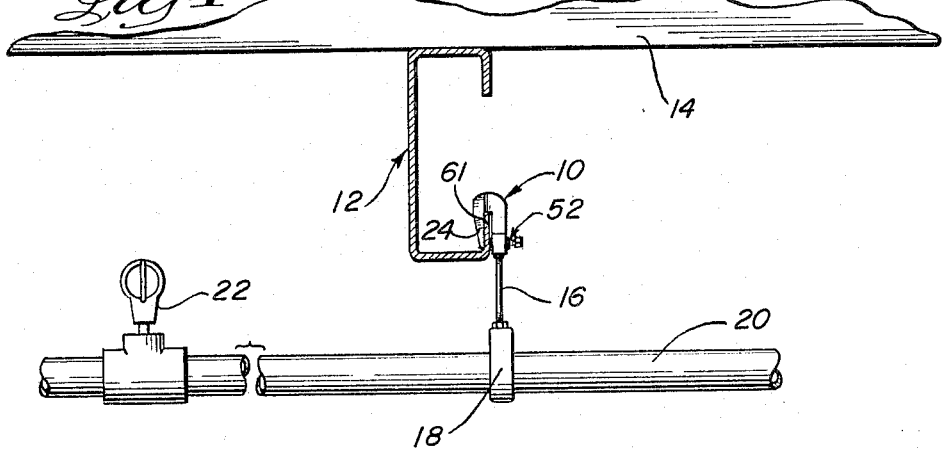
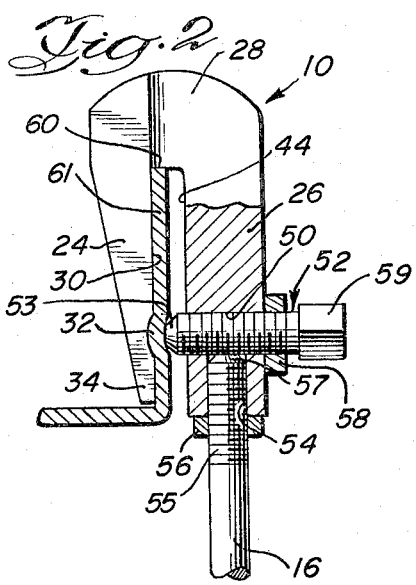
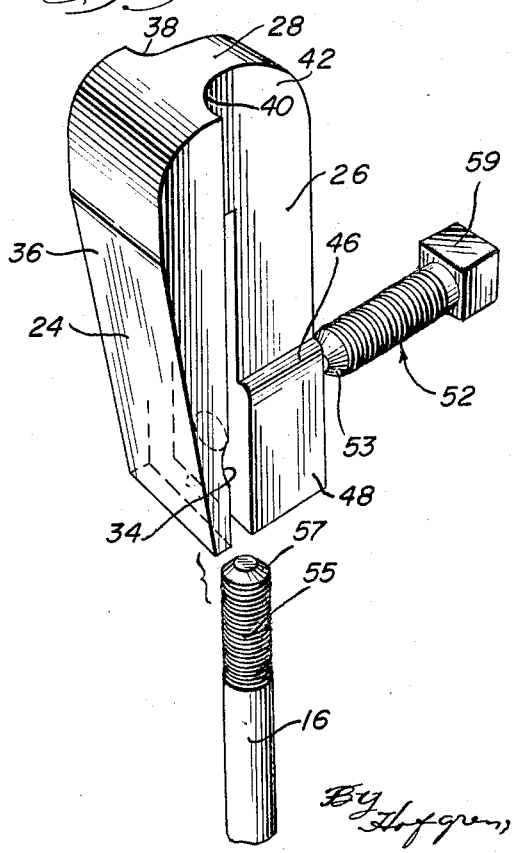
INVENTOR
David W. Evans
By Hofgren, Wegner, Allen, Stellman & McCord
ATTORNEYS з,266,762
Patented August 16, 1966

3,266,762
HANGER CLAMP
David W. Evans, Flint Lake Trailer Park, R.F.D. 5,
Valparaiso, Ind.
Filed June 9, 1965, Ser. No. 462,614
9 Claims. (Cl. 248—72)

This invention relates to clamps and more particularly to a special purpose hanger clamp.

Heretofore many different systems have been employed to suspend piping and the like from supports in buildings and in particular overhead supports. For instance, fire control systems, certain electrical conduit, supports and other piping must traverse large expanses of roof areas of most industrial facilities. Different methods have been used to suspend these pipes, supports, hangers and conduits from the building rafters such as drilling holes in the structural supports, welding brackets on the rafters, and even the use of C clamps to engage with the edge of the beams or other structural members.

For many years the chief form of rafter used in industrial installations was either the conventional I beam or regular channel shaped members. The clamps used heretofore were particularly adapted for connection to those members. More recently C shaped or box type rafters or support elements are being used more and more in industrial, commercial and residential facilities. The conventional C clamps are not adapted for use with these elements or if used, must do so in a rather awkward and sometimes unsafe fashion.

It is therefore a principal object of this invention to overcome the above noted disadvantages of the prior art and to provide an improved clamp for hanger applications.

It is still another object of this invention to provide an improved special purpose clamp for attachment to particular structural members.

And still a further object of this invention is to provide an improved clamp shape adapted for both heavy duty and light duty use.

A further object of this invention is to provide an improved clamp wherein the support attaching element can be locked in position by the article holding element.

And a further object of this invention is to provide an improved clamp construction wherein dual or alternate use of the clamp is contemplated.

And a still further object of this invention is to provide an improved special purpose clamp that is positive in its attachment to a structural member.

These and other objects and advantages of this invention will be more fully appreciated from the following detailed description wherein:

FIGURE 1 is a diagrammatic view in elevation of the clamp of my invention as attached to a structural member;

FIGURE 2 is an elevational view partially broken away and in section of the clamp attached to the web of a beam; and FIGURE 3 is a perspective view slightly enlarged of my invention with parts exploded.

Referring to the drawings wherein similar reference numerals refer to similar parts throughout the several views, and in particular FIGURE 1 shows a clamp 10 mounted on a C or box type rafter 12, which rafter supports a roof element 14. A hanger rod 16 and ring 18 are suspended from the clamp for supporting a member such as a conduit or pipe 20 passing through the opening in the ring. A sprinkler head 22 is shown mounted on the pipe 20 although it is within the context of this invention that the clamp be used to support any and all types of elements that require suspension from a support member.

Referring to FIGURES 2 and 3, the clamp member 10 is shown as having a pair of spaced apart side or body portions 24 and 26 joined together by a web or bight portion 28. The body portion 24 is considered the attaching arm of the clamp and has an inner contact surface 30 in which is formed a transverse detent or groove 32. The body 24 is tapered from its juncture with the bight portion 28 to a relatively thin forward edge portion 34. The body portion 24 has substantial width to provide a greater bearing surface against the part to which it is to be attached. An outer face 36 slopes upwardly from the forward edge portion 34 and is curved or rounded gradually around and into the bight 28. The bight end of the body portion 24 has substantially the same width as the body 24 throughout the full length of that half of the clamp. Curved or tapered fillets 38 and 40 blend from the wide body portion 24 through the bight 28 into the other narrower body portion 26.

The body portion 26 is narrower than the portion 24 throughout the upper portion of its length extending from the bight 28 to just beyond the center of the length of the clamp. The body portion 26 widens out at 46 just below the center of its length into a width substantially equal to the width of the body portion 24 to form an anchor portion 48. The body portion 26 has an inner face 44 lying in a plane substantially parallel to the plane of the face 30 on the body portion 24 and spaced therefrom in face to face relationship. The lower half of the body 26 widens out at 46 into an anchor portion 48 having a width substantially the same as the width of the body 24. Where the body portion 24 is quite thick or wide in the direction parallel to the plane of the face 30, the body portion 26 is quite thick in the direction perpendicular to the plane of the face 30. The thicknesses and the orientation of the body portions 24, 26 are such as to provide a maximum strength for the clamp together with a maximum of purchase and retention capability. In use, it is often desirable to have the bottom face or edge of body 24 touch the portion or inner bend of the channel or beam 12, however, this is not absolutely necessary.

The anchor portion 48 has an aperture 50 extending through the width of the body 26 along an axis substantially perpendicular to the plane of the surface 44. Threads are formed in the aperture 50 which are adapted to receive a case hardened set screw 52 having a cup-shaped leading end portion 53 and a square head 59. The head could be hexagonal shape or the like without departing from the spirit of this invention. Another aperture 54 is formed upwardly from the bottom face of the anchor portion 48 generally centrally thereof so as to intersect symmetrically at right angles to the aperture 50. The aperture 54 lies along an axis substantially perpendicular to the bottom face of the body portion 26 and is threaded throughout its length. The threaded aperture 54 is adapted to receive a hanging rod 16 which has a machine thread 55 formed on one end portion thereof and has a cup-shaped end portion 57 adapted to engage with the threads on the set screw 52. The rod 16 and the set screw 52 are adapted to have lock nuts 56, 58, respectively, threadingly engaged therewith in such a way as to be tightened against the faces of the anchor portions 48 of the clamp. The set screw 52 and rod 16 are tightened into position in the clamp whereupon tightening the lock nuts 56, 58 against the body portion of the clamp prevents the screw 52 and rod 16 from working loose. It it believed to be obvious that one or both lock nuts 56, 58 could be eliminated without departing from my invention. In use, none, one or two lock nuts can be used depending on the demands of the installation.

The rod 16 can be used to support any number of items but in the illustrated form is adapted to support a ring 18 threaded on the lower end thereof in a position to receive the conduit or pipe 20.

The clamp 10 is adapted to have the body portion 24 placed over a lip 60 of one upwardly facing flange 61 on a beam or support 12 and has the face 30 aligned with the inside surface of the flange. The exposed edge of the lip 60 is aligned with the slot formed by the parallel surfaces 30 and 44 of the body portions 24 and 26. The clamp 10 is brought down over the flange 61 of the beam whereupon the set screw 52 can be tightened against the flange 61 possibly until an indentation is formed therein in alignment with the detent 32 in the surface 30 in the body portion 24 of the clamp. Tightening the set screw 52 will have a tendency to collapse the material of the flange an amount sufficient to form a bight or gripping action with the support. The lock nut 58 is then tightened on the set screw 52 against the outer face of the anchor portion 48 of the clamp so that the set screw 52 is prevented from backing out of the clamp. The hanger 16 is tightened up into the aperture 54 so that the cup pointed end 57 also bites into the threads of the set screw 52, in this way further locking the set screw 52 against loosening. A lock nut 56 can be tightened on the threads 55 of the rod 16 up against the edge of the anchor portion of the clamp so as to lock the rod and its hanger in position on the clamp.

With the clamp 10 thus secured to the support, the desired piping or the like can be installed without fear of shifting or dropping due to failure of the clamp.

In the event an I-beam or other type of support is used for supporting the roof or other structural members of a building, the invention entailed in this clamp can still be used; that is, the clamp is slid horizontally on to the flange or bottom portion of the I-beam with the parallel surfaces 30 and 44 lying horizontally and bearing against opposite sides of the flange of the beam. Used this way the hanger 16 is threaded into the aperture 15 for locking the clamp on the beam and for suspending the piping or the like. The set screw 52 is now threaded into the aperture 54 and serves only to lock the hanger 16 against backing out of its holding position on the beam.

Hanger clamps known heretofore were only adapted for use by horizontally slipping the clamp onto a horizontally disposed flange of a structural member. Several years ago formed structural members started appearing with small vertical flanges on the outer edges. These shallow vertical flanges presented no problem because the bight or open portion of the clamp was wide enough to fit horizontally over the shallow vertical flange. Subsequently the vertical flanges became deeper so that the clamp could only be used by cutting out a hunk of the vertical flange to permit the clamp to be fastened to the beam from the horizontal direction. To cut the beam flange is undesirable both from a safety standpoint as well as from the cost point of view. With my improved clamp herein described I am able to affix the clamp to the deep vertical flanges of structural members without any preparation. The strong portion of the clamp is over the structural member with the pull downward in such a way as to be extremely safe and efficient and even assuming the set screw 52 is not rigidly set, the clamp is not going to slip off from the flange and drop the load. In addition, the clamp can be used in the horizontal position on a horizontal flange, thereby being more universal in application than any clamp known heretofore.

While a specific embodiment of my improved hanger clamp has been shown and described in the foregoing description, it will be understood that various modifications within the spirit of the invention may occur to those skilled in the art. Therefore it is intended that no limitations be placed on the invention except as defined by the scope of the appended claims.

I claim:

1. A hanger clamp comprising a first body portion, a second body portion spaced from said first body portion and being joined thereto by a bight portion, a flat planar bearing surface formed on said first body portion, an anchor portion formed on said second body portion in spaced relation with said flat planar bearing surface, a set screw threaded through said anchor portion along an axis substantially perpendicular to said planar bearing surface, and a hanger rod threaded into said anchor portion along an axis perpendicular to and intersecting with the axis of the set screw whereby tightening the set screw and the rod will lock the clamp on a support.

2. A hanger clamp for attachment to a vertical flange of a support comprising a first body portion, a second body portion spaced from said first body portion and being joined thereto by a bight portion, a flat planar bearing surface formed on said first body portion for engagement with said vertical flange, an anchor portion formed on said second body portion in spaced relation with said flat planar bearing surface, a set screw threaded through said anchor portion along an axis substantially perpendicular to said planar bearing surface and adapted to engage with said vertical flange, and a hanger rod threaded into the bottom of said anchor portion and extending along an axis perpendicular to and intersecting with the axis of the set screw whereby tightening first the set screw and then the rod will lock the clamp on said flange of said support.

3. A hanger clamp comprising a first body portion, a second body portion spaced from said first body portion and being joined thereto by a bight portion, a flat planar bearing surface formed on said first body portion and being adapted to be in engagement with a flange of a support, an anchor portion formed on said second body portion in spaced relation with said flat planar bearing surface on the opposite side of said flange from said first body portion, said anchor portion having an aperture therethrough along an axis perpendicular to the flat planar bearing surface, said anchor portion having a second aperture extending inwardly from the side of said anchor portion most remote from the junction between the first and second body portions, the axis of said second aperture intersecting with the axis of the first named aperture, means threaded into said apertures for locking said clamp to said support and for suspending members from said clamp, respectively.

4. A hanger clamp comprising a pair of spaced apart body portions joined together by a bight portion, a planar bearing surface formed on one body portion in spaced relation to an anchor portion formed on the other body portion, said anchor portion having a pair of apertures formed therein at right angles to each other with at least one aperture lying along an axis perpendicular to the planar bearing surface, means threaded into each of said apertures with one such means adapted to engage with a support member and the other means adapted to engage with said first named means whereby the clamp can be locked to a support and an element can be suspended from said clamp.

5. A hanger clamp comprising a pair of spaced apart members joined together by a bight portion to form an open ended slot between said members, one of said members having a pair of intersecting apertures formed therein, one of said apertures lying on an axis substantially perpendicular to a surface on the other of said members, and said second aperture lying on an axis substantially perpendicular to said first named axis of the first named aperture.

6. A clamp as claimed in claim 5 and having said apertures adapted to receive set screw means and rod means, which means coact with each other to lock the clamp on a support and to lock the rod means on the clamp.

7. A hanger clamp comprising a pair of spaced apart members joined together by a bight portion, one of said members having a pair of threaded apertures therein with their axes intersecting at substantially right angles with each other, and one of said apertures passing through said one member and having its axis substantially perpendicular to said other member.

8. A clamp as claimed in claim 7 and having a set screw threaded into one of said apertures and having a rod threaded into said other aperture.

9. A clamp as claimed in claim 7 and having a set screw threaded into said aperture lying on the axis perpendicular to said other member and a rod threaded into the aperture lying along the axis at right angles to said first named aperture.

References Cited by the Examiner

UNITED STATES PATENTS

| | | | |
|---|---|---|---|
| 1,840,216 | 1/1932 | Tormo | 248—72 |
| 2,659,561 | 11/1953 | Kindorf | 248—228 |
| 2,678,786 | 5/1954 | Kindorf | 248—72 |
| 2,855,169 | 10/1958 | Hintz | 248—125 |
| 3,112,016 | 11/1963 | Peterson | 248—228 X |

CLAUDE A. LE ROY, *Primary Examiner.*